United States Patent [19]

Yamamoto et al.

[11] Patent Number: 4,642,437
[45] Date of Patent: Feb. 10, 1987

[54] ELECTRODE ROLL FOR ELECTRIC RESISTANCE WELDING

[75] Inventors: Masatoshi Yamamoto; Yasushi Kawai; Katsuyoshi Shudo; Hiroyuki Kato, all of Sagamihara; Shunsuke Masuda, Kamakura, all of Japan

[73] Assignee: Daiwa Can Company, Limited, Tokyo, Japan

[21] Appl. No.: 811,755

[22] Filed: Dec. 20, 1985

[30] Foreign Application Priority Data

Dec. 26, 1984 [JP] Japan .................. 59-278822

[51] Int. Cl.⁴ .............................................. B23K 11/06
[52] U.S. Cl. ........................................ 219/84; 219/119
[58] Field of Search ............. 219/84, 83, 81, 119, 219/120

[56] References Cited

U.S. PATENT DOCUMENTS 4,188,523  2/1980  Kawai et al. .................. 219/83
4,433,229  2/1984  Morikawa et al. .................. 219/84

FOREIGN PATENT DOCUMENTS 2351534  3/1975  Fed. Rep. of Germany ........ 219/84
2805345  8/1979  Fed. Rep. of Germany ........ 219/84
75291    5/1982  Japan ..................... 219/119

Primary Examiner—Harold Broome
Assistant Examiner—C. M. Sigda
Attorney, Agent, or Firm—Wenderoth, Lind & Ponack

[57] ABSTRACT

An electrode roll for electric resistance welding which contains a stator member at least partly made of Cu or Cu alloy, a rotor member at least partly made of Cu or Cu alloy and rotatably mounted on the stator member, and a fusible alloy mainly composed of gallium and filling as a conductive medium an annular gap between the stator and rotor members, and portions of those two members facing the gap and being made of Cu or Cu alloy are covered by an alloy layer containing Co and W in weight proportions of 90:10 to 30:70.

3 Claims, 5 Drawing Figures

FIG. 3 (X9)
FIG. 4 (X9)

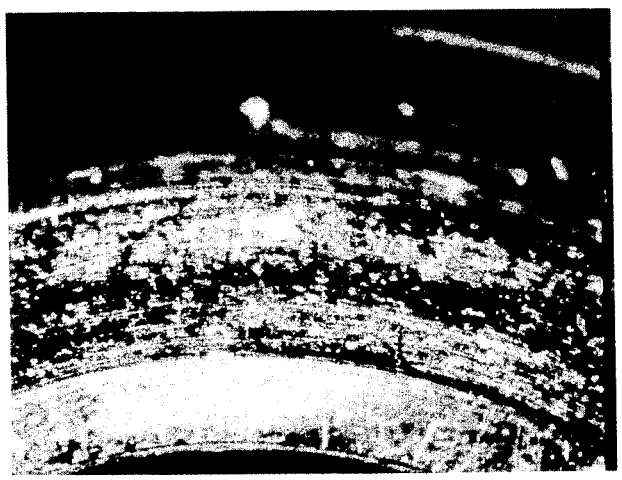
FIG. 5 (X9)

ELECTRODE ROLL FOR ELECTRIC RESISTANCE WELDING

FIELD OF THE INVENTION

This invention relates to an electrode roll for welding machines in which a side seam of overlapped portions of a can body is formed by electric resistance seam welding. More specifically, the invention concerns an electrode roll in which a fusible conductive liquid alloy mainly composed of gallium is sealed in a gap formed between a stator and a rotor. Hereinafter, "a fusible conductive liquid alloy" means an alloy the melting point of which is 30° C. or less.

PRIOR ART

Up to date, a side seam of overlapped portions of a can body, i.e., a blank of such metal sheet as tin- or nickel-plated steel sheet set in a cylindrical form, is formed by an electric resistance seam welding process. In this process, the overlapped portions of the can body are squeezed via a copper wire electrode between electrode rolls on their inner and outer sides while current is passed through them.

FIG. 2 shows a typical example of the electrode roll which is used in the electric resistance seam welding.

Referring to FIG. 2, reference numeral 1 designates stator located centrally of the electrode roll and having a disk-like portion. A major portion of the stator is made of copper or a copper alloy. Reference numeral 2 designates rotor which is rotatably mounted on stator 1 such as to surround the disk-like portion thereof. A major portion of the rotor is made of copper or a copper alloy. The outer periphery of the rotor is formed with a groove which accommodates a wire electrode.

Reference numeral 3 designates a conductive liquid metal filling gap 7 formed between stator 1 and rotor 2. Reference numeral 5 designates seal member for sealing conductive liquid metal 3 against leakage to the outside, and numeral 6 ball bearing for facilitating the rotation of rotor 2 about stator 1. Current is led to stator 1 through an electrode roll holder (not shown).

Reference numeral 8 is a cooling water passage, through which cooling water is passed to prevent overheating of the electrode rolls by the welding heat. Although not shown in the Figure, cooling water passage 8 has an extension extending into the disk-like portion of stator 1. Other types of electrode roll than that shown in FIG. 2 are one, in which a rotor is rotatably mounted on substantially on a central portion of a stator, and one, in which stator portions are provided on the inner and outer sides of a rotor as disclosed in U.S. patent specification No. 4,051,343.

In any type of electrode roll as noted above, a conductive liquid metal is provided between the stator and rotor (the major portion of which is made of copper or a copper alloy) to permit current to be passed therebetween.

Usually, mercury is used as the conductive liquid metal of the electrode roll. Mercury has a very low melting point of −39° C., and it maintains the liquid phase not only at normal temperature but also at a considerably lower temperature, e.g., −20° C. For this reason, mercury is a suitable conductive liquid metal.

However, mercury has considerably stong toxicity. Therefore, a substitute material which is free from toxicity is desired in view of the possible leakage of mercury.

There is found no substitute element metal for mercury, which has a melting point lower than normal temperature. As a result of extensive researches and investigations, however, it has been found that a four-element alloy composed of 67 wt % of gallium, 20 wt % of indium, 10 wt % of tin and 3 wt % of zinc has a solidification point of 6.5° C. and a melting point of 8.5° C. as well as having a resistivity of 22 $\mu\Omega$cm, i.e., more than four times the conductivity of mercury, the resistivity of which is 95.8 $\mu\Omega$cm.

We, Daiwa Can Co., Ltd., the assignee of the present application, has proposed a new technique of sealing the quaternary alloy noted above in combination with an inert gas as a conductive medium, as disclosed in Japanese Patent Open Publication No. 77076/1981 (June 25, 1981). In the same patent open publication, a binary alloy (Ga, In) mainly composed of gallium is proposed as the conductive liquid metal for the electrode roll. Further, it has been proposed to improve the wetting property of the conductive liquid metal with respect to the stator and rotor by adding 0.005 to 0.05 wt % of an impurity (e.g., $SiO_2$, $Al_2O_3$ in the form of powder) to a six-element alloy mainly composed of gallium (i.e., composed of 69.5±5.0 atomic % of gallium, 15.2±1.0 atomic % of indium, 6.1±1.0 atomic % of tin, 4.5±0.8 atomic % of zinc, 3.3±0.5 atomic % of silver and 1.5±0.5 atomic % of aluminum), as disclosed in Japanese Patent Publication No. 40355/1980 (Oct. 17, 1980) of Nihon Electric Co., Ltd. et al.

Further, it has been proposed to provide nickel or iron plating on the surfaces of the rotor and stator, facing a gap therebetween, of an electrode roll using a six-element alloy mainly composed of gallium as the conductive liquid metal in order to reduce the electric resistance of contact between the six-element alloy and the rotor and stator surfaces noted above, that is, in order to improve the wetting property of the rotor and stator surfaces with respect to the six-element alloy, as disclosed in Japanese Patent Publication No. 40395/1980 (Oct. 17, 1980) of Nihon Electric Co., Ltd. et al.

Further, in an electrode roll using a fusible alloy mainly composed of gallium as the conductive liquid metal, the fusible alloy is suddenly solidified when the temperature becomes lower than 5° C. The resultant volume expansion of the alloy will cause rupture of the electrode roll. To prevent this, it has been proposed to secure fine particles of a mixture or a alloy composed of one of more members of a group consisting of tungsten, molybdenum, vanadium and titanium to the surface of a lower portion of the stator facing the gap, thereby retarding the speed of solidification of the fusible alloy, as disclosed in Japanese Patent Publication No. 40358/1980 (Oct. 17, 1980) of Nihon Electric Co., Ltd. at el.

Further, in order to extend the life of an electrode roll using gallium or a fusible alloy mainly composed of gallium as the conductive liquid metal, it has been proposed to plate the rotor and stator surfaces facing the gap with such a metal that an alloy that is formed when the metal is introduced into the gallium or fusible alloy mainly composed of gallium has a melting point lower than the melting point of the initial gallium or fusible alloy mainly composed of gallium, as disclosed in Japanese Patent Open Publication No. 75291/1982 (May 11, 1982).

Problems To Be Improved

The electrode roll is usually made of copper or a copper alloy substantially for its entirety in order to provide for satisfactory conductivity. Gallium, however, strongly attacks copper. Copper, therefore, is introduced from the stator and rotor into the fusible alloy mainly composed of gallium in a short period of time from the start of use of the electrode roll, specifically within a maximum period of 100 hours. The melting point of the fusible alloy is thus increased. For example, while the melting point of gallium is 29.8° C., an alloy resulting from the mixture of 10 wt % of copper into gallium has as high melting point as 100° C.

It was shown that when more than 4 wt % of copper was mixed into the four-element alloy composed of gallium, indium, tin and zinc in the proportions noted before, the alloy being used as the conductive liquid metal of an electrode roll, the liquid metal underwent gellation so that the rotor could no longer be rotated, (that is, the electrode roll could no longer be used).

This situation will now be described in greater detail.

PRIOR ART EXAMPLE 1

An electrode roll having the structure as shown in FIG. 2 and using as conductive liquid metal 3 a four-element alloy composed of 67 wt % of gallium, 20 wt % of indium, 10 wt % of tin and 3 wt % of zinc was employed.

Stator 1 and rotor 2 of the electrode roll were made of a chromium-copper alloy, and the surface of the chromium-copper alloy was in direct contact with the four-element alloy sealed in gap 7.

The electrode roll was used for seam welding of can bodies. After the lapse of 13 hours from the start of use, failure of rotation of rotor 2 of the electrode roll occurred.

This electrode roll was disassembled, and the surface of the chromium-copper alloy that had been in contact with conductive liquid metal 3 (i.e., four-element alloy) was inspected. It has found that the entire surface examined was attacked.

Both stator 1 and rotor 2 were attacked in the same way. FIG. 3 is an enlarged-scale photograph of a portion of the attacked surface of rotor 2.

PRIOR ART EXAMPLE 2

The surfaces of stator 1 and rotor 2 of the electrode roll having the same structure as in Prior Art Example 1 in contact with conductive liquid metal 3 (four-element alloy) in gap 7, i.e., the inner surface of stator 1 and outer surface of rotor 2, these surfaces facing gap 7, was electroplated with cobalt to an average thickness of 3 microns. The same four-element alloy as in Prior Art Example 1 was then sealed in gap 7.

This electrode roll was used for seam welding of can bodies. After the lapse of 93 hours from the start of use, a slip occurred between the wire electrode and electrode roll due to an increase of the torque on the electrode roll. The operation then was stopped, and the electrode roll was disassembled and inspected. It was found that the cobalt plating surface that had been in contact with conductive liquid metal (i.e., four-element alloy) was locally attacked and formed with pores. The corresponding portions of the chromium-copper alloy were also concentratedly attacked and formed with pores.

FIG. 4 is an enlarged-scale photograph of a portion of the attacked surface.

It will be seen from the above prior art examples that the prior art electrode rolls using gallium or a fusible alloy mainly composed of gallium have too short life and are hence impractical.

BRIEF DESCRIPTION OF THE DRAWINGS

FIG. 3 is an enlarged scale photograph of a portion of rotor surface attacked by four-element alloy in Prior Art Example 1;

FIG. 4 is an enlarged-scale photograph of a portion of rotor surface attacked by four-element alloy in Prior Art Example 2; and FIG. 5 is an enlarged-scale photograph of a portion of rotor surface constituted by cobalt-tungsten plating layer containing cobalt and tungsten in weight proportions of 40:60 in Example 1 after the rotor has been in contact with four-element alloy for 200 hours, i.e., after electrode roll has been used for 200 hours.

OBJECTS OF THE INVENTION

Figure 1:
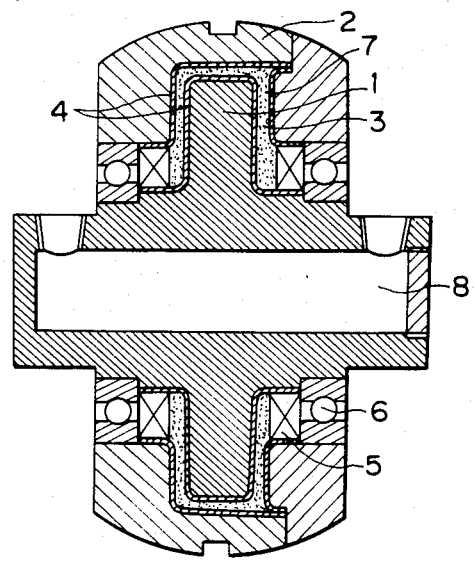
FIG. 1 is a longitudinal sectional view showing an embodiment of the electrode roll for welding according to the invention.
Figure 2:
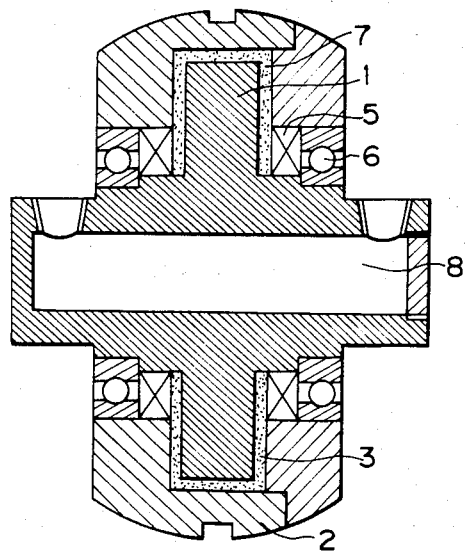
FIG. 2 is a longitudinal sectional view showing a prior art electrode roll for welding.

As object of the invention is to extend the life of an electrode roll, which uses a fusible alloy mainly composed of gallium as a conductive liquid metal, beyond 100 hours by protecting the stator and rotor members made of copper or a copper alloy from the attacking action of the fusible alloy.

Another object of the invention is to further extend the life of the electrode roll using the fusible alloy mainly composed of gallium by increasing the electric conductivity of the electrode roll by reducing the electric resistance of contact between the stator and rotor members of copper or a copper alloy and fusible alloy and also reducing heat generation as well as protecting the stator and rotors from the attacking action of the fusible alloy.

MEANS FOR ATTAINING THE OBJECTS

The inventors have conducted extensive researches and investigations with an aim of preventing the attacking action of the fusible alloy mainly composed of gallium as the conductive liquid metal on copper or a copper alloy as material of the stator and rotor members of an electrode roll for electric resistance welding and providing an electrode roll, in which the fusible alloy mainly composed of gallium provides excellent characteristics as conductive medium and which can withstand long use.

The invention is perfected in a finding that it is effective to cover the stator and rotor member surfaces of copper or a copper alloy (these surfaces being in contact with the fusible alloy) with a cobalt-tungsten alloy layer.

A feature of the invention resides in an electrode roll for electric resistance welding, which comprises a stator member at least partly made of copper or a copper alloy, a rotor member at least partly made of copper or a copper alloy and rotatably mounted on the stator member, and a fusible alloy mainly composed of gallium and filling as a conductive medium an annular gap defined between the stator and rotor members, wherein portions of the stator and rotor members facing the annular gap and being made of copper or a copper alloy are covered by an alloy layer containing cobalt and tungsten in weight proportions of 90:10 to 30:70.

Another feature of the invention resides in an electrode roll for electric resistance welding, which comprises a stator member at least partly made of copper or a copper alloy, a rotor member at least partly made of copper or a copper alloy and rotatably mounted on the stator member, and a fusible alloy mainly composed of gallium and filling as a conductive medium an annular gap defined between the stator and rotor members, wherein portions of the stator and rotor members facing the annular gap and being made of copper or a copper alloy are covered by an alloy layer containing cobalt and tungsten in weight proportions of 90:10 to 30:70 and then covered by at least one metal layer composed of one member of a group consisting of tin, zinc, silver, gallium, indium and aluminum, or at least one alloy layer composed of two or more members of said group.

FUNCTIONS

With the electrode roll, in which the stator and rotor member surfaces of copper or a copper alloy (these surfaces facing the gap between the stator and rotor members and being in contact with the fusible alloy mainly composed of gallium) are covered by an alloy layer containing cobalt and tungsten in weight proportions of 90:10 to 30:70 prior to filling the gap between the stator and rotor members with the fusible alloy mainly composed of gallium, the stator and rotor members are not attacked by the fusible alloy even after long use of the electrode roll for welding because of the presence of the cobalt-tungsten alloy layer. In addition, the electrode roll provides superior conductivity to that of the one using mercury as the conductive metal liquid for long time.

With the electrode roll, in which the said stator and rotor member surfaces described above are covered by an alloy layer containing cobalt and tungsten in weight proportions of 90:10 to 30:70 and then covered by at least one metal layer composed of one member of a group consisting of tin, zinc, silver, gallium, indium and aluminum, or at least one alloy layer containing two or more members of said group prior to filling the gap between the stator and rotor members with the fusible alloy mainly composed of gallium, the wetting property of the surfaces of contact between the fusible alloy and stator and rotor members is improved to reduce heat generation due to the electric resistance at the contact surfaces and hence improve the electric conductivity of the electrode roll. This is so because the outermost layer of the stator and rotor members that is in contact with the fusible alloy is the above-mentioned metal layer or alloy layer. These metals, namely, tin, zinc, silver, gallium, indidum and aluminum, have satisfactory wetting property with respect to the fusible alloy. In addition, each of them is a metal which can form an eutectic alloy with gallium, in other words, a metal which forms an alloy when it is introduced into the fusibile alloy, the melting point of said formed alloy being lower than that of gallium. In a further aspect, the metal layer or alloy layer noted above has an effect of extremely reducing the time required for the inner cobalt-tungsten alloy layer to be attacked by the fusible melting alloy. Further, the cobalt-tungsten alloy layer is difficultly attacked by the fusible alloy. Thus, the electrode roll has very excellent electric conductivity and can be used for still longer time.

PREFERRED EMBODIMENTS OF THE INVENTION

Examples of the Invention will be given below.

Example 1

Referring to FIG. 1, reference numeral 1 designates stator located centrally of the electrode roll and having a disk-like portion. Reference numeral 2 designates rotor rotatably mounted on stator 1 such as to surround the disk-like portion thereof. The outer periphery of the rotor is provided with a groove for accommodating a wire electrode.

Major portions of stator 1 and rotor 2 are made of a chromium-copper alloy.

Reference numeral 3 designates conductive liquid metal filling gap 7 defined between stator 1 and rotor 2. In this embodiment, the conductive liquid metal is a four-element alloy composed of 67 wt % of gallium, 20 wt % of indium, 10 wt % of tin and 3 wt % of zinc.

Reference numeral 4 designates electroplating layer of a cobalt-tungsten layer formed to an average thickness of 3 microns on the outer surface of stator 1 and inner surface of rotor 2, these surfaces facing gap 7.

Reference numeral 5 designates seal member for sealing the four-element alloy against leakage, and numeral 6 is a ball bearing for facilitating the rotation of rotor 2.

Reference numeral 8 is a cooling water passage, through which cooling water is passed. Actually, the cooling water passage has an extension extending in the disk-like portion.

Current is led to stator 1 through an electrode roll holder (not shown).

Electrode rolls for welding can bodies having the above structure were fabricated by varying the weight proportions of cobalt and tungsten in the electroplating layer from 90:10 to 30:70 at an interval of 10%. With the electrode roll where the weight proportions of cobalt and tungsten are 90:10, the torque was increased after 150 hours had been passed from the start of use. This was due to slip between the wire electrode and electrode roll. Then the welding machine was stopped, and the electrode roll was disassembled and inspected. It was proved that the inner conductive liquid metal retained the fluidity so that it was still capable of use. However, local attacking and pore formation of the plated surface of stator 1 and rotor 2 had begun.

With the electrode rolls where the content of tungsten was increased, the torque did not become abnormal even after 200 hours of use, as shown in Table 1. Also, the inner conductive liquid metal had the same fluidity as at the time when it had been sealed. Further, the plating surface of stator 1 and rotor 2 was entirely free from attacking. FIG. 5 is an enlarged-scale photograph of a portion of the plated surface of rotor 2 of a typical example of the electrode roll where the proportions of cobalt and tungsten are 40:60.

TABLE 1

| Contents of protective plating materials, in wt % | | Time of use of electrode roll, |
|---|---|---|
| Co (%) | W (%) | in hours |
| 90 | 10 | At least 150 |
| 80 | 20 | At least 200 |
| 70 | 30 | At least 200 |
| 60 | 40 | At least 200 |
| 50 | 50 | At least 200 |
| 40 | 60 | At least 200 |

TABLE 1-continued

| Contents of protective plating materials, in wt % | | Time of use of electrode roll, in hours |
|---|---|---|
| Co (%) | W (%) | |
| 30 | 70 | At least 200 |

Where the content of tungsten exceeded 70 wt %, however, fine cracks were formed in the finished plating surface, so that the electrode could not be used.

Therefore, the tungsten content in the cobalt-tungsten alloy layer should be no higher than 70 wt %.

On the other hand, in case that the tungsten content is under 10 wt %, the life-span of the electrode rolls could not be over 100 hours, so said tungsten content should be 10 wt % or more.

The thickness of the cobalt-tungsten alloy layer may be 3 to 5 microns. At the corners of the projecting and recessed portions of the stator and rotor that face the gap, the thickness of the alloy layer is usually 3 microns or above. In this respect, when forming the alloy layer by the electroplating process, the angle of the corners is preferably other than an acute angle but with R of R=0.4 mm or above from the standpoint of the adhesion and close contactness of the alloy layer.

The alloy layer may be formed by any other suitable process than the electroplating, e.g., a fusion spraying process.

EXAMPLE 2

The electrode roll where the portions of the outer surface of stator and inner surface of rotor that face the gap are covered by a cobalt-tungsten alloy layer, is capable of use for at least 150 hours as shown in Table 1.

However, it was found when a number of electrode rolls with cobalt-tungsten alloy layer were disassembled and inspected after long use that in some of then the fusible alloy mainly composed of gallium was not adhered to some portions of the cobalt-tungsten alloy layer. That is, it was found that the wetting property of the cobalt-tungsten alloy layer with respect to the fusible alloy was poor.

To improve this wetting property of the cobalt-tungsten alloy layer with respect to the fusible alloy, the cobalt-tungsten alloy layer was covered by a metal which has rich wetting property with respect to the fusible alloy and can form an eutectic alloy with gallium.

More specifically, the outer surface of stator 1 and inner surface of rotor 2 that face gap 7 of the electrode roll having the structure shown in FIG. 1 were plated with a cobalt-tungsten alloy layer containing 40 wt % of cobalt and 60 wt % of tungsten and having a thickness of approximately 3 microns and then coated with a very thin tin plating layer with a thickness of 1 micron or below prior to filling gap 7 with the same four-element alloy as in Example 1. A number of electrode rolls were fabricated in this way.

These electrode rollers could be used for longer time than the electrode rolls of Example 1 could, i.e., at least 260 hours.

After the long use these electrode rolls were disassembled and inspected to confirm that the fusible alloy mainly composed of gallium was adhered to the entire tin plating surface.

With the electrode rolls of this example, the fusible alloy in contact with the tin layer attacks this layer and adheres itself to the attacked portions. This has an effect of reducing the electric resistance between the fusible alloy and stator and rotor, thus reducing the heat generation in the interface as well as the speed of attacking of the inner cobalt-tungsten alloy layer by the fusible alloy. The life of the electrode roll thus can be further extended.

Further, with the electrode rolls of this example, the electric resistance between the fusible alloy and stator and rotor is lower than in the case of the electrode rolls of Example 1, that is, the former is superior in electric conductivity to the latter.

The metal used to cover the cobalt-tungsten alloy layer may be any metal which has rich wetting property with respect to the fusible alloy mainly composed of gallium, and produces an alloy which is newly formed when the metal is introduced into the fusible alloy, which is different from said fusible alloy in components or proportions, and which has a melting point lower than that of gallium. Examples of this metal, other than tin, are zinc, silver, gallium, indium and aluminum either in the form of an element itself or in the form of alloys of these elements.

In the above Examples 1 and 2, the four-element alloy composed of 67 wt % of gallium, 20 wt % of indium, 10 wt % of tin and 3 wt % of zinc was used as the fusible alloy mainly composed of gallium. The weight proportions of the components of the alloy, however, are not limited to this case, but they may be varied, for instance to 65.6 wt % of gallium, 21.3 wt % of indium, 9.6 wt % of tin and 3.6 wt % of zinc. Further, it is possible to use other four-element alloys or two- five- or six-element alloys as well.

Examples are a two-element alloy composed of 88 wt % of gallium and 12 wt % of tin, a two-element alloy composed of 96.4 wt % of gallium and 3.6 wt % of silver, a four-element alloy composed of 65.6 wt % of gallium, 21.3 wt % of indium, 10.7 wt % of tin and 2.5 wt % of silver, a five-element alloy composed of 63.4 wt % of gallium, 20.6 wt % of indium, 10.3 wt % of tin, 3.3 wt % of zinc and 2.4 wt % of silver and a six-element alloy composed of 69.5 wt % of gallium, 15.2 wt % of indium, 6.1 wt % of tin, 4.5 wt % of zinc, 3.2 wt % of silver and 1.5 wt % of aluminum.

The proportions of the element components of the fusible alloy mainly composed of gallium may be suitable varied.

Effect of the Invention

As has been described in the foregoing, with the electrode roll according to the invention the portions of stator and rotor in contact with the fusible alloy mainly composed of gallium as the conductive liquid metal is covered by the cobalt-tungsten alloy layer containg cobalt and tungsten in weight proportions of 90:10 to 30:70, the cobalt-tungsten alloy layer being difficultly attacked by the fusible alloy. Therefore, the copper content of the stator and rotor of the electrode roll will not be in contact with the fusible alloy for a long time of at least 150 hours until the cobalt-tungsten alloy layer is formed with pores with the attacking effect of the fusible alloy. That is, it takes a very long time until the rotation of the rotor becomes difficult, i.e., the electrode roll can no longer be used, due to intrusion of copper component of the stator and rotor into the fusible alloy. In other words, the electrode roll according to the invention can be used for very long time compared to the prior art electrode roll. Further, when the cobalt-tungsten alloy layer is covered by a metal layer constituted by one member of a group consisting of tin, zinc, silver, gallium, indium and aluminum (these metals having satisfactory wetting properties with respect to the fusible alloy and being capable of forming an eutectic alloy with gallium), or an alloy layer composed of two or more members of said group, very excellent conductivity and longer life can be obtained.

We claim:

1. An electrode roll for electric resistance welding comprising a stator member at least partly made of copper or a copper alloy, a rotor member at least partly made of copper or a copper alloy and rotatably mounted on said stator member, and a fusible alloy mainly composed of gallium and filling as a conductive medium an annular gap defined between said stator and rotor members, wherein portions of said stator and rotor members facing said annular gap and being made of copper or a copper alloy are covered by an alloy layer containing cobalt and tungsten in weight proportions of 90:10 to 30:70.

2. An electrode roll for electric resistance welding comprising a stator member at least partly made of copper or a copper alloy, a rotor member at least partly made of copper or a copper alloy and rotatably mounted on said stator member, and a fusible alloy mainly composed of gallium and filling as a conductive medium an annular gap defined between said stator and rotor members, wherein portions of said stator and rotor members facing said annular gap and being made of copper or a copper alloy are covered by an alloy layer containing cobalt and tungsten in weight proportions of 90:10 to 30:70 and then covered by at least one metal layer composed of one member of a group consisting of tin, zinc, silver, gallium, indium and aluminum, or at least one alloy layer composed of two or more members of said group.

3. The electrode roll according to claim 1 or 2, wherein said fusible alloy mainly composed of gallium is a four-element alloy composed of gallium, indium, tin and zinc.

* * * * *